United States Patent [19]

Gilleland

[11] 4,433,674
[45] Feb. 28, 1984

[54] SOLAR COLLECTOR HAVING RESILIENT AND ADJUSTABLE MOUNTING MEANS

[75] Inventor: Frank W. Gilleland, Toledo, Ohio

[73] Assignee: Owens-Corning Fiberglas Corporation, Toledo, Ohio

[21] Appl. No.: 334,018

[22] Filed: Dec. 23, 1981

[51] Int. Cl.³ .............................................. F24J 3/02
[52] U.S. Cl. ................................ 126/450; 248/635; 52/710
[58] Field of Search .................. 126/450; 52/208, 397, 52/788, 784, 787, 710; 248/609, 635, 677

[56] References Cited

U.S. PATENT DOCUMENTS

| | | | |
|---|---|---|---|
| 3,493,025 | 2/1970 | LaLonde et al. | 52/710 |
| 4,062,351 | 12/1977 | Hastwell | 126/444 |
| 4,141,528 | 2/1979 | Herb et al. | 248/560 |
| 4,201,190 | 5/1980 | Bowen | 126/450 |
| 4,341,200 | 7/1982 | Bowen | 126/450 |
| 4,366,808 | 1/1983 | Nash | 126/450 |

FOREIGN PATENT DOCUMENTS

| | | | |
|---|---|---|---|
| 532716 | 9/1931 | Fed. Rep. of Germany | 52/710 |
| 1029623 | 5/1958 | Fed. Rep. of Germany | 248/677 |

Primary Examiner—Samuel Scott
Assistant Examiner—A. Flanigan
Attorney, Agent, or Firm—Ronald C. Hudgens; Greg Dziegielewski

[57] ABSTRACT

A solar collector assembly is provided comprising an absorber means adapted to transfer heat to a fluid, a solar energy transmitting cover member, a housing adapted to receive said cover member and to contain said absorber means, said housing having a bottom wall and a plurality of foot sections adapted to receive an after-defined elastomeric body, and an elastomeric body fastened to said foot sections, said elastomeric body having an articulated slot adapted to slideably receive an insert adapted to engage fastener means associated with a mounting bracket to movably secure said housing to said bracket.

3 Claims, 8 Drawing Figures

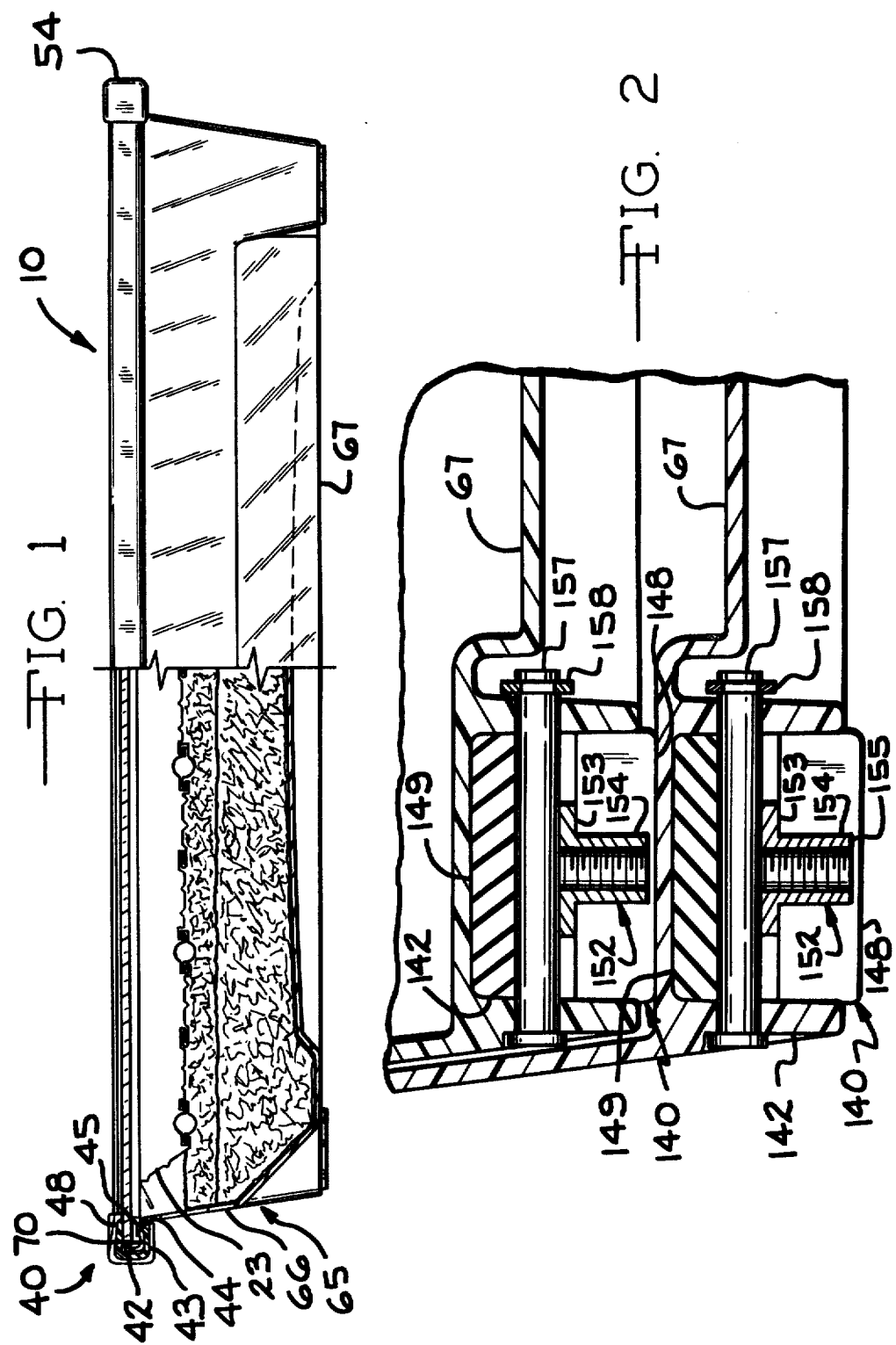

SOLAR COLLECTOR HAVING RESILIENT AND ADJUSTABLE MOUNTING MEANS

TECHNICAL FIELD

The invention disclosed herein relates to solar collectors having elastomeric mounting means, particularly those having housings made of sheet molding compound.

BACKGROUND OF THE INVENTION

There have been many designs for solar collectors throughout the years. Generally, such solar collectors have been fabricated from a multitude of parts which can substantially increase costs and lead to less than the desired quality.

The present invention simplifies the design of a basic solar collector to provide an easily assembled low cost solar collector requiring a minimum of skill for assembly, while providing an effective high quality, durable solar energy collection device.

DISCLOSURE OF THE INVENTION

The invention disclosed herein pertains to an absorber means adapted to transfer heat to a fluid, a solar energy transmitting cover member, a housing adapted to receive said cover member and to contain said absorber means, said housing having a bottom wall and a plurality of foot sections adapted to receive an afterdefined elastomeric body, and an elastomeric body fastened to said foot sections, said elastomeric body having an articulated slot adapted to slideably receive an insert adapted to engage fastener means associated with a mounting bracket to movably secure said housing to said bracket.

BRIEF DESCRIPTION OF THE DRAWINGS

FIG. 1 is a partial cross-sectional elevational view of a solar collector assembly.

FIG. 2 is an enlarged cross-sectional view of a portion of two partially assembled collector assemblies in a nested relationship.

BEST MODE OF CARRYING OUT THE INVENTION

Figure 1A:
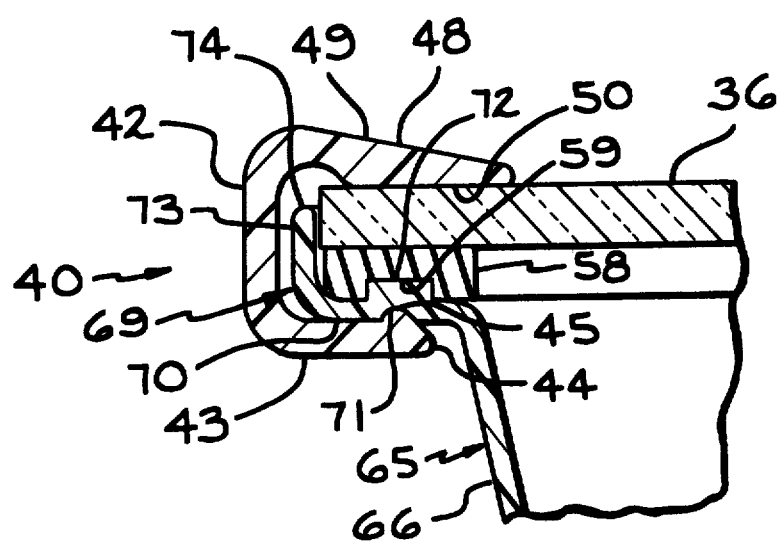
FIG. 1A is an enlarged cross-sectional view of the collar section of the collector assembly as shown in FIG. 1.

As shown in FIGS. 1 and 2 solar collector assembly 10 is comprised of housing 65, absorber means 12, insulation 30, cover means 36, clamping member 40, corner element 54, gasket 58 and elastomeric mounting means 140.

Absorber means 12 is adapted to receive the solar energy impinging thereon and transfer the heat to the fluid moving therethrough. Absorber means 12 may be of any suitable type as is known in the art, such as the tube and fin type shown in the drawings. As such, absorber means 12 is comprised of an inlet header having a first end and a second end.

Second end extends outwardly through sidewall 66 of housing 65 and is preferably associated with a gasket to prevent the influx of undesired air or water between housing 65 and the second end. The first end is associated with a hose fastened thereto by means of a pair of clamps. The hose extends outwardly through housing 65 and is preferably associated with a gasket to seal the region around the hose and sidewall 66 of housing 65.

Intermediate the inlet header and the outlet header, tubes 22 are in communication therewith to provide a circulatory path for the working fluid. As is known in the art, fins 23 are suitably secured to tubes 22 to increase the collection and transfer of thermal energy to the working fluid. The working fluid may be of any suitable type such as is known in the art.

The outlet header has a first end and a second end. The second end extends outwardly through sidewall 66 of housing 65, and the first end is associated with another hose which is suitably fastened thereto by a pair of clamps. Similarly, the hose extends outwardly through sidewall 66, and the second end and the hose should be associated with suitable gaskets to seal such regions at sidewalls 66. Of course, such headers are adapted to interconnect a plurality of such collector assemblies and/or with conventional control and storage systems.

Insulation material 30 is provided between bottom wall 67 of housing 65 and absorber means 12 to reduce the heat loss through housing 65 and to partially support absorber 12 within housing 65.

Insulation 30 may be of any suitable type, but preferably such insulation is of the oil and binder-free glass fiber wool type insulation, such as Owens-Corning Fiberglas Corporation type SI-100. If the insulation were to have a binder or coating that would volatilize upon reaching a temperature below which the absorber plate may rise to during operating or stagnating conditions, the coating may outgas and collect upon the inner surface of cover member 36 and reduce the ability of cover member 36 to transmit solar energy therethrough.

However, it has been found that insulation material 30 may be comprised of a first layer 31 of the oil-free and binder-free type positioned in contact with absorber means 12 in combination with a second layer 32 positioned intermediate first layer 31 and housing bottom wall 67. First layer 31 may be chosen to thermally insulate layer 32 from the absorber 12, such that second layer 32 may be of the binder containing glass fiber wool type insulation. Preferably, second layer 32 contains only a minimal amount of such binder, such as Owens-Corning Fiberglas Corporation SI-20 wool type insulation.

Housing 65 includes bottom wall 67 and sidewalls 66 that have a collar section 69 extending continuously around the peripheral edge of sidewalls 66. Collar section 60 includes continuous ledge 70 that extends laterally outward from sidewall 66. Lip 73 defines the upper edge of housing 65 and extends upwardly from ledge 70.

Ledge 70 extends continuously around the periphery of sidewall 66 and includes a continuous boss 72 adapted to couple with or engage recess 59 of gasket or sealing means 58. Preferably, gasket 58 is of the endless or continuous type and may be made of any suitable elastomeric material to provide an effective seal to air and water between cover member 36 and ledge 70 of collar section 69.

On the side opposite containing boss 72, a plurality of grooves 71 in ledge 70 are provided to receive beads 45 of the "C" shaped clamping members 40. One groove 71 extends along each straight or edge portion of the collar section 69. Grooves 71 terminate at stop post 75 extending downwardly from ledge 70. Stop posts 75 are adapted to prevent the clamping members 40 from sliding or working along the length of collar section 69.

Thus, with stop post 75 and grooves 71, clamping members 40 are restrained from substantial lengthwise and/or transverse movement with respect to housing 65 when properly installed.

Lip 73 is configured such that distal end 74 thereof extends upwardly a distance sufficient to be immediately adjacent lateral edge 37 of cover member 36, that is, to be at least partially within the plane of cover member 36. Thus, cover member 36 is held in registration in housing 65 by means of lip 73 such that cover member 36 is prevented from sliding or working its way off housing 65. Solar energy transmitting or cover member 36 may be of any suitable type, such as glass which is well known in the art.

Clamping member or fastening means 40, which is substantially "C" shaped, is comprised of a first or center section 42 having a second or lower section 43 and a third or upper section 48 extending transversely therefrom, as can be seen in FIG. 9. Bead 45 extends along the length of second section 43 at the distal end 44 thereof and is adapted to engage grooves 71.

Third section 48 includes an interior or cover member contacting surface 50 and an exterior surface 49. Interior surface 50 should be relatively burr-free so as not to abraid cover 36. Third section 48 should be relatively thin, and exterior surface 49 should be slightly angled to provide a low edge profile with respect to the exterior surface of cover plate 36.

Normally, such solar collectors are angled approximately 30 to 45 degrees from horizontal. The low edge profile provided by the "C" shaped clamping member 40 promotes relatively quick self-cleaning of snow that could accumulate on the surface of the collector assembly under certain conditions.

In essence, "C" shaped clamping member 40 is a laterally extended spring clip that is adapted to substantially uniformly bias cover plate 36 against housing collar section 69 having gasket means 58 positioned therebetween. As such, the distance between the lower section 43 and the upper section 48, which are slightly angled with respect to one another in the unsprung condition, should be less than the distance between the lower side of ledge 70 and the upper edge of cover 36 when assembled for proper loading or biasing. If desired, a gasket may also be placed between interior surface 50 and cover plate 36.

Clamping member 40 may be made from any suitable material, but it is preferred that the clamping member be made from a pultruded glass fiber reinforced plastic.

As shown in the drawings, one clamping member 40 is positioned along each straight portion of the collar section 69. Intermediate the adjacent ends of clamping members 40, a pliable corner element 54 is fitted over the corners of collar section 69. Corner elements 54 are preferably of the type disclosed in U.S. patent application Ser. No. 310,186 filed Oct. 9, 1981, in the names of Scott A. Calvert and George R. Smith, which is hereby incorporated by reference. As disclosed in the afore-mentioned co-pending patent application, the lateral projections of corner elements 54 are adapted to register between the center section 42 of clamping member 40 and lip 73 of collar section 69. Corner element 54 may be made of any suitable elastomeric material.

As shown in FIGS. 1 and 2, sidewalls 66 extend downwardly and inwardly from ledge 70 to form, in part, foot sections 80 of housing 65. As such, one foot section 80 is formed at each corner of housing 65. The lower extremities of sidewalls 66 at the corners thereof have foot walls 81 extending inwardly therefrom to form receptacle 82 which is adapted to receive elastomeric mounting means 88. One portion of sidewall 66 and one foot wall 81 of each foot section 80 have apertures 83 extending therethrough adapted to receive fastening means or pin 98.

Figure 3:
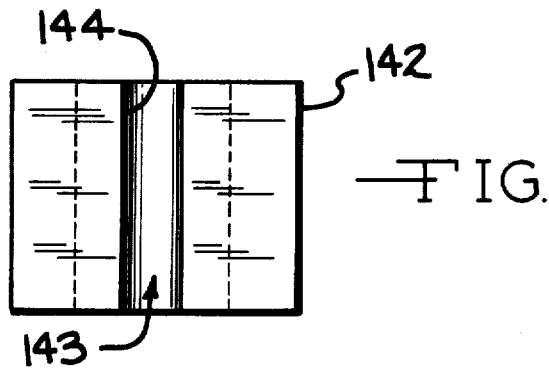
FIG. 3 is a plan view of the elastomeric body of the mounting means.
Figure 4:
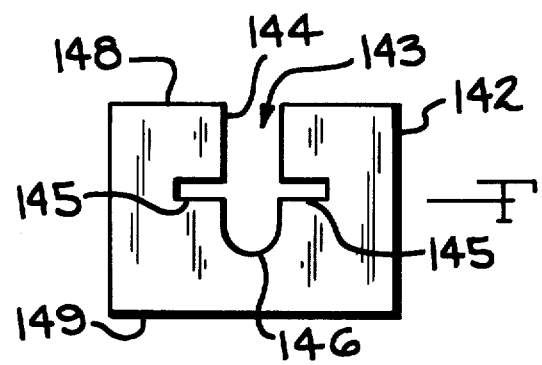
FIG. 4 is a front view of the body shown in FIG. 3.
Figure 5:
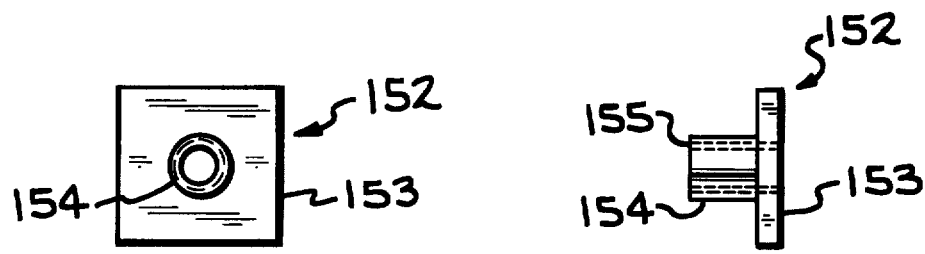
FIG. 5 is a plan view of the insert of the mounting means.
Figure 6:
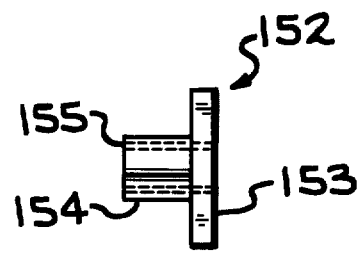
FIG. 6 is a side view of the insert shown in FIG. 5.

As shown in FIGS. 2 through 4, elastomeric mounting means 140 is comprised of elastomeric body 142, insert 152 and fastening means 157.

Elastomeric body 142 includes an articulated slot 143 adapted to slideably receive insert 152. Articulated slot 143 is comprised of channel section 144 having undercut sections 145 laterally extending from channel section 144. Recess 146 of articulated slot 143 extends along the line of channel section 144 and is in communication with undercut sections 145. That is, undercut sections 145 are located intermediate channel section 144 and recess 146, all of which extend the full length of body 142.

Channel section 144 meets the first side 148 of body 142, while recess 146 is disposed towards second side 149 of body 142.

Insert 152 is comprised of a base 153 having a threaded sleeve 154 extending or projecting transversely therefrom. Channel section 144 is adapted to receive sleeve 154 and undercut sections 145 are adapted to accommodate base 153 therein to slideably secure insert 152 within body 142.

Figure 7:
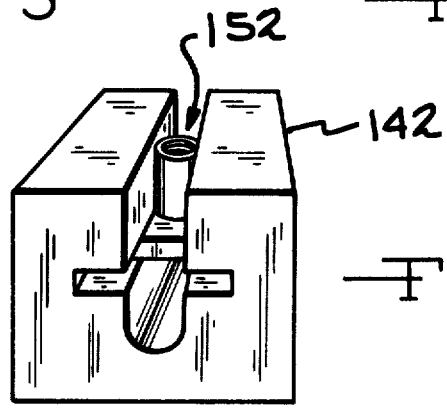
FIG. 7 is an isometric view of the insert positioned within the elastomeric body.

As can be seen in FIGS. 2 and 7, the distal end 155 of insert 152 is located beneath the plane of first slide 148 such that when partially assembled collector assemblies are stacked or nested within another, first side 148 of body 142 engages bottom wall 167 of housing 65 to provide a cushioning effect between nested housings.

Recess 146 of body 142 is adapted to receive fastening means pin 157 which, when assembled, extends through one sidewall 66 and one foot wall 81 of foot section 80 to secure body 142 within receptacle 82.

Pin 157 has a head on one end and is adapted to accommodate retaining ring 158 at the opposite end to locate pin 157 within foot section 80.

Elastomeric body 142 can be made of any suitable material, but preferably is of a material that is extrudable. Thus, a continuous length of such a body having articulate slot 143 formed therein may be extruded and elastomeric body 142 may be formed by merely cutting or severing the continuous length to form parts of the proper dimension.

Thus, with elastomeric mounting means 140, housing 65 is securely but movably fastened to any desired structure, such as a mounting bracket. Also insert 152 is permitted lateral adjustment or movement along or within slot 143 when employing elastomeric mounting means 140.

Thus, elastomeric mounting means 140 is adapted to absorb misalignments and deflections of the solar collector assembly mounting bracket and the like in the absence of placing an undue strain upon collector assembly 10.

Preferably, solar collector assembly is generally of the type disclosed in concurrently filed U.S. patent application Ser. No. 334,016 filed on Dec. 23, 1981 in the names of Frank W. Gilleland, Byron W. Engen and James W. Rinehart, which is hereby incorporated by reference.

Solar collector assemblies 10 are normally mounted on top of a structure or the like having a mounting frame or bracket fastened thereto. Insert 93 is adapted to receive a threaded fastener associated with the aforementioned bracket to secure elastomeric body 90 to said bracket. Thus, housing 65 is securely but movably fastened to the mounting frame such that elastomeric mounting means is adapted to absorb deflections and/or misalignments between or in solar collector assembly 10 and the mounting frame and/or structure to which it is fastened in the absence of placing an undue strain upon collector assembly 10.

It is to be noted that in lieu of the mechanical fastening means 157, elastomeric body may be adhesively bonded to foot section 80, if desired.

Housing 65 may be made of any suitable material, but it is preferred that housing 65 be molded from sheet molding compound, a type of glass fiber reinforced resinous sheet, in conjunction with a matched metal mold die set to provide high volume, high quality production.

Solar collector 10 preferably includes a pressure relief system to compensate for the changes in internal and ambient pressures due to the heating and/or cooling of the solar collector assembly, and the like. As such, such a pressure relief system can consist of small vent holes formed in sidewalls 66 or bottom wall 67 to provide communication between the interior of housing 65 and the ambient atmosphere. Alternatively, solar collector assembly may be equipped with a passageway through housing 65 in combination with a regenerative desiccant system similar to that set forth in U.S. Pat. No. 3,990,429, issued on Nov. 9, 1976.

Solar collector assembly 10 may be used in conjunction with closed loop or open loop circulation systems as is known in the art.

It is apparent that within the scope of the present invention, modifications and different arrangements can be made other than as herein disclosed. The present disclosure is merely illustrative, with the invention comprehending all variations thereof.

INDUSTRIAL APPLICABILITY

The invention described herein is readily applicable to the production and employment of solar energy collecting systems.

I claim:

1. A solar collector assembly comprising an absorber means adapted to transfer heat to a fluid moving therealong; a solar energy transmitting cover member; a housing adapted to contain said absorber means, said housing having a collar section extending around the periphery thereof; sealing means located at the collar section of the housing; a clamping means extending along the collar section to substantially uniformly bias the transmitting member toward the collar section of the housing, said housing having a bottom wall, sidewalls and a plurality of spaced-apart foot sections adapted to receive a plurality of after-defined elastomeric bodies, said sidewalls being tapered and extended to form at least a portion to said foot sections; and elastomeric bodies fastened within said foot sections, said elastomeric bodies having an articulated slot adapted to slideably receive an insert adapted to engage a fastener means associated with a mounting bracket to movably secure said housing to said bracket, said articulated slot having a channel section in communication with at least one laterally extending undercut section, said insert having a base and a sleeve, said channel section being adapted to receive said sleeve and said undercut section being adapted to receive said base, said articulated slot having a recess in communication with said undercut section, said recess being adapted to receive a retainer means adapted to secure said elastomeric body to said foot section.

2. The solar collector assembly to claim 1 wherein said sleeve has a distal end located within said elastomeric body.

3. The solar collector assembly of claim 2 wherein said retainer means is a pin adapted to extend through one of said foot sections and the recess of said elastomeric body.

* * * * *